United States Patent
Shibata (10) Patent No.: US 8,388,928 B2
(45) Date of Patent: Mar. 5, 2013

(54) METHOD FOR PRODUCING MAGNESIUM-CONTAINING ZINC OXIDE, MAGNESIUM-CONTAINING ZINC OXIDE, AND APPARATUS FOR PRODUCING SAME

(75) Inventor: Koji Shibata, Yamaguchi (JP)

(73) Assignee: Ube Material Industries, Ltd (JP)

( * ) Notice: Subject to any disclaimer, the term of this patent is extended or adjusted under 35 U.S.C. 154(b) by 0 days.

(21) Appl. No.: 13/377,074

(22) PCT Filed: Jun. 4, 2010

(86) PCT No.: PCT/JP2010/059550
§ 371 (c)(1),
(2), (4) Date: Jan. 12, 2012

(87) PCT Pub. No.: WO2010/143596
PCT Pub. Date: Dec. 16, 2010

(65) Prior Publication Data
US 2012/0104318 A1      May 3, 2012

(30) Foreign Application Priority Data
Jun. 12, 2009    (JP) .................... 2009-141588

(51) Int. Cl.
*C01F 17/00*    (2006.01)
(52) U.S. Cl. .............. 423/623; 423/594.14; 423/275
(58) Field of Classification Search .......... 423/594.14, 423/594.16, 623, 275
See application file for complete search history.

(56) References Cited

U.S. PATENT DOCUMENTS 4,721,610 A * 1/1988 Yoshida et al. ............... 423/636
2010/0003179 A1   1/2010 Katusic et al.

FOREIGN PATENT DOCUMENTS

| JP | 61-122106 | 6/1986 |
| JP | 2004-182519 | 7/2004 |
| JP | 2006-233047 | 9/2006 |
| JP | 2006-335914 | 12/2006 |
| WO | 2007/144242 | 12/2007 |

OTHER PUBLICATIONS

G. Ning et al.; Structure and optical properties of MGxZn1-xO nanoparticles prepared by sol-gel method; Optical Materials; Mar. 11, 2004; vol. 27, No. 1, pp. 1-5.
S. Ohshiro et al.; Low-temperature Synthesis of Nanometer-sized Single Crystals in MgO-ZnO Solid Solution; Jul. 20, 2002; vol. 75, No. 7, pp. 327-329.

* cited by examiner

Primary Examiner — Steven Bos
(74) Attorney, Agent, or Firm — Clark Hill PLC (57) ABSTRACT

Provided is an apparatus for producing magnesium-containing zinc oxide, including: zinc vapor producing means 11 which produces zinc vapor by heating metallic zinc; magnesium vapor producing means 15 which produces magnesium vapor by heating metallic magnesium; mixed vapor producing means 20 which produces mixed vapor by mixing the zinc vapor and the magnesium vapor; and oxidizing gas contact means 19 which produces magnesium-containing zinc oxide by bringing an oxidizing gas into contact with the mixed vapor. The content of zinc in the mixed vapor is adjusted to be higher than that of magnesium.

3 Claims, 4 Drawing Sheets

METHOD FOR PRODUCING MAGNESIUM-CONTAINING ZINC OXIDE, MAGNESIUM-CONTAINING ZINC OXIDE, AND APPARATUS FOR PRODUCING SAME

RELATED/PRIORITY APPLICATION

This application is a National Phase filing regarding International Application No. PCT/JP2010/059550, filed on Jun. 4, 2010, which relies upon Japanese Application No. 2009-141588, filed on Jun. 12, 2009, for priority.

TECHNICAL FIELD

The present invention relates to a method and an apparatus for producing magnesium-containing zinc oxide which can be used as a blue phosphor and the like.

BACKGROUND ART

It is known that magnesium-containing zinc oxide, i.e., partially magnesium oxide solid-solubilized zinc oxide has a hexagonal Wurtzite crystal structure, and when an oxygen defect is introduced, emits bluish light under electron beam irradiation or Ultraviolet excitation (Non-Patent Document 1). Especially, magnesium-containing zinc oxide with a high concentration of solid-solubilized magnesium has a high luminance efficiency and can be used as an environmentally-benign zinc oxide blue phosphor, because zinc and magnesium from which it is made are abundant and nonpolluting resources.

Methods for producing such magnesium-containing zinc oxide include a solid reaction method, a coprecipitation method, and a hydrothermal synthesis method.

Among them, the solid reaction method, which reacts zinc oxide powder and magnesium oxide powder in their solid phase, can produce magnesium-containing zinc oxide at a low cost and in a large volume. However, because the solid solubility limit of magnesium in a solid-phase reaction is approximately 2 mol %, when magnesium is reacted at a ratio above a composition of $Zn_{0.98}Mg_{0.02}O$, this method results in deposition of cubic MgO, exhibiting a problem that magnesium cannot be solid-solubilized in zinc oxide at a high concentration.

One method for overcoming this problem is to cause a solid-phase reaction in the presence of a flux of potassium chloride or the like to allow magnesium solid-solubilize up to 20 mol % (Non-Patent Document 1). However, this method results in a large amount of impurities being contained in the product, and it is necessary but difficult to remove the flux components. Moreover, the reaction temperature required in the solid reaction method is a high temperature of 1300° C. or higher, which is another problem because zinc oxide might sublimate and make it difficult to obtain magnesium-containing zinc oxide having a uniform composition. Furthermore, in order to be used for a phosphor, the zinc oxide powder needs to have a high purity, a uniform particle size, and a good dispersibility. However, the solid reaction method results in production of an agglomerated particle state of zinc oxide, and requires additional steps of pulverization and classification in order to obtain a uniform particle size, which is yet another problem.

On the other hand, the coprecipitation method can produce magnesium-containing zinc oxide with a high concentration of solid-solubilized magnesium at a low temperature of 1000° C. or lower. For example, there is known a method of mixing a mixed aqueous solution of zinc and magnesium with an organic acid component to coprecipitate an organic acid double salt, and pyrolyzing the obtained organic acid double salt (Patent Document 1, Non-Patent Document 2).

The hydrothermal synthesis method can also produce magnesium-containing zinc oxide with a high concentration of solid-solubilized magnesium at a low temperature. For example, there is known a method of producing particles by forming a layer of magnesium-containing zinc oxide on micro-substrates made of zinc oxide, sapphire, or the like (Patent Document 2).

CONVENTIONAL ART DOCUMENTS

Patent Documents

Patent Document 1: JP2006-233047A
Patent Document 2: JP2006-335914A

Non-Patent Documents

Non-Patent Document 1: Mie Prefectural Industrial Research Institute, Study Report 32, 11-17 (2008)
Non-Patent Document 2: Mie Prefectural Industrial Research Institute, Study Report 31, 6-10 (2007)

DISCLOSURE OF INVENTION

Problem to be Solved by the Invention

However, the coprecipitation method is problematic in that magnesium-containing zinc oxide having a uniform composition is difficult to obtain because of the difference in the coprecipitation speed, the coprecipitating agent needs to be removed, the obtained magnesium-containing zinc oxide is agglomerated, etc. The hydrothermal synthesis method is problematic in that the production process is complicated because a pulverization step is required to manufacture micro-substrates, magnesium-containing zinc oxide cannot be produced at a low cost and in a large volume because of the essential problem of hydrothermal synthesis that the reaction speed is low, etc., and the obtained magnesium-containing zinc oxide is agglomerated. Furthermore, the flux method is problematic in that the flux component needs to be removed, magnesium-containing zinc having a uniform composition is difficult to obtain, pulverization and classification steps are required to obtain a uniform particle size, etc.

Hence, an object of the present invention is to provide a method and an apparatus for producing magnesium-containing zinc oxide which can efficiently produce a large volume of magnesium-containing zinc oxide that is highly pure with little impurities, homogeneous, and has a high content rate of magnesium.

Means for Solving the Problem

To achieve the above object, the inventors have conducted earnest researches, and as a result, found it possible to efficiently produce a large volume of magnesium-containing zinc oxide that is highly pure with little impurities and homogeneous, by mixing a larger amount of zinc vapor and a smaller amount of magnesium vapor and reacting the mixed vapor with an oxidizing gas. That is, the present invention provides a method for producing a magnesium-containing zinc oxide, comprising: a step of producing zinc vapor by heating metallic zinc; a step of producing magnesium vapor by heating metallic magnesium; a step of producing mixed vapor by mixing the zinc vapor and the magnesium vapor; and a step of producing magnesium-containing zinc oxide by bringing an oxidizing gas into contact with the mixed vapor, wherein the content of zinc in the mixed vapor is higher than that of magnesium.

The present invention also provides an apparatus for producing magnesium-containing zinc oxide, comprising: zinc vapor producing means which produces zinc vapor by heating metallic zinc; magnesium vapor producing means which produces magnesium vapor by heating metallic magnesium; mixed vapor producing means which produces mixed vapor by mixing the zinc vapor and the magnesium vapor; and oxidizing gas contact means which produces magnesium-containing zinc oxide by bringing an oxidizing gas into contact with the mixed vapor, wherein the content of zinc in the mixed vapor is adjusted to be higher than that of magnesium.

In the method and apparatus for producing magnesium-containing zinc oxide according to the present invention, it is preferable that the metallic zinc used as a material have a purity of 99.9 mass % or higher, and for example, metallic zinc such as electrolytic zinc having a purity of 3N (three-nine) level can be used. Further, it is preferable that the metallic magnesium used as a material have a purity of 99.9 mass % or higher, and for example, metallic magnesium such as that having a purity of 3N (three-nine) level obtained by electrolysis or thermal reduction can be used.

Effect of the Invention

As described above, according to the present invention, it is possible to provide a method and an apparatus for producing magnesium-containing zinc oxide which can efficiently produce a large volume of magnesium-containing zinc oxide that is highly pure with little impurities, homogeneous, and has a high content rate of magnesium.

BEST MODE FOR CARRYING OUT THE INVENTION

Next, an embodiment of a magnesium-containing zinc oxide producing apparatus according to the present invention will be explained with reference to the drawings.

Figure 1:
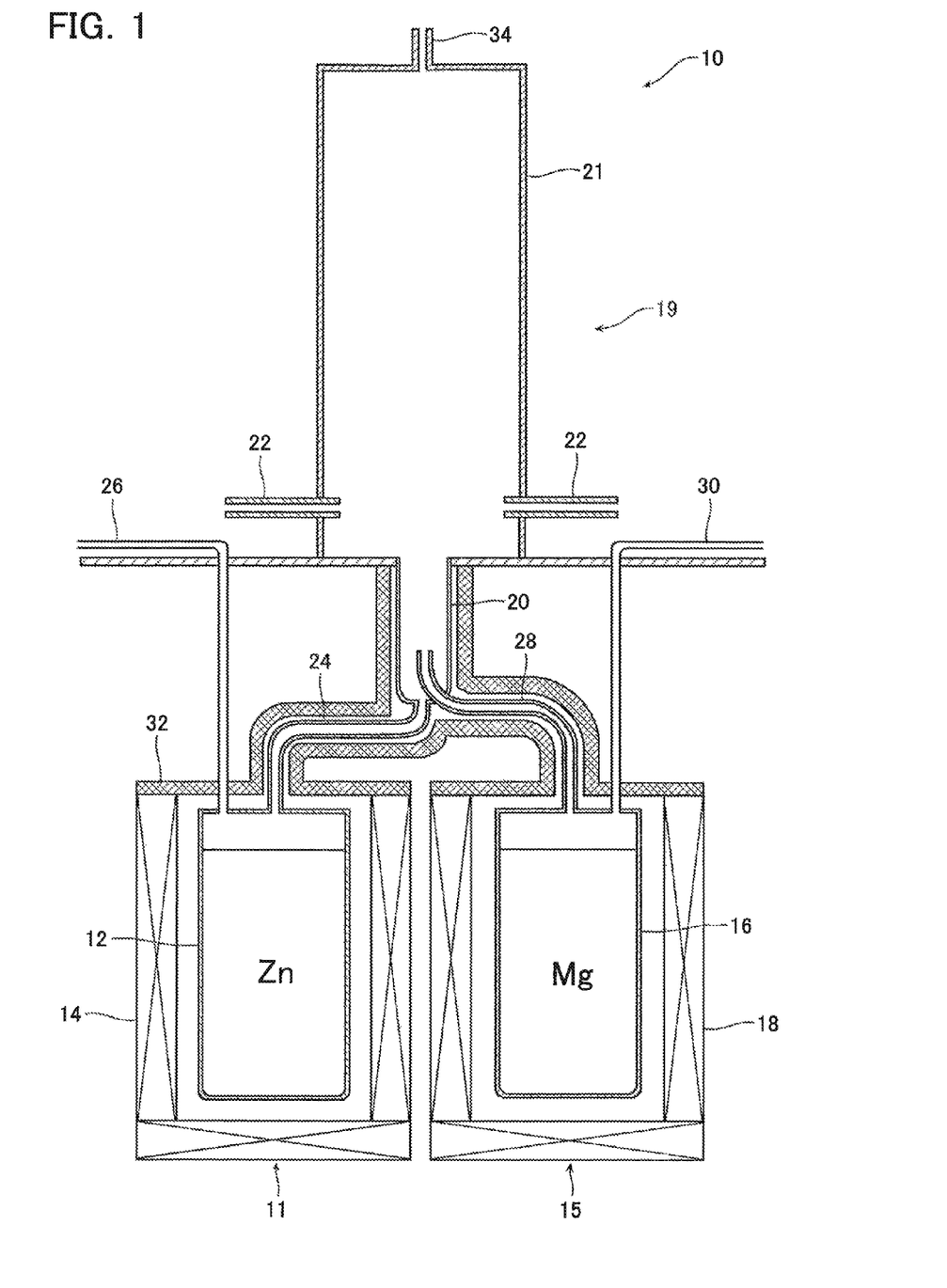
FIG. 1 is a conceptual cross-sectional diagram of an apparatus for producing magnesium-containing zinc oxide according to an embodiment.

A magnesium-containing zinc oxide producing apparatus 10 comprises a zinc vapor producing unit 11 for producing zinc paper by heating metallic zinc, a magnesium vapor producing unit 15 arranged in parallel with the zinc vapor producing unit 11, a mixed vapor jetting nozzle 20 provided above the zinc vapor producing unit 11 and the magnesium vapor producing unit 15 to mix zinc vapor and magnesium vapor and to jet the mixed vapor, and an oxidizing gas contact unit 19 provided above the mixed vapor jetting on nozzle 20 for reacting the mixed vapor with an oxidizing gas.

The zinc vapor producing unit 11 comprises a zinc containing vessel 12 in which metallic zinc is contained, a heat source 14 arranged to cover the zinc containing vessel 12 except its top surface, and a zinc vapor jetting nozzle 24 connected from the center of the top surface of the zinc containing vessel 12 to the mixed vapor jetting nozzle 20.

The zinc containing vessel 12 contains metallic zinc, and the shape of the zinc containing vessel 12 is not especially limited but preferably cylindrical. A carrier gas introduction duct 26 for externally introducing a carrier gas into the zinc containing vessel 12 is connected to a position in the top surface of the zinc containing vessel 12 that is off the center of the top surface to the external side. The heat source 14 may be any type as long as it can heat metallic zinc until it is evaporated. For example, the heat source 14 may be a resistive-heating type, a flame-heating type, and a high-frequency-heating type. Preferable zinc vapor producing means is a zinc vapor producing unit which comprises: a zinc containing vessel in which metallic zinc is contained; a heat source which covers the zinc containing vessel except its top surface; and a zinc vapor jetting nozzle from which zinc vapor is jetted out into a mixed vapor jetting nozzle, and to which a carrier gas introduction duct for introducing a carrier gas into the zinc containing vessel is connected.

The magnesium vapor producing unit 15 comprises a magnesium containing vessel 16 in which metallic magnesium is contained, a heat source 18 arranged to cover the magnesium containing vessel 16 except its top surface, and a magnesium vapor jetting nozzle 28 extending from the center of the top surface of the magnesium containing vessel 16 into the mixed vapor jetting nozzle 20.

The magnesium containing vessel 16 contains metallic magnesium, and the shape of the magnesium containing vessel 16 is not particularly limited but preferably cylindrical. A carrier gas introduction duct 30 for externally introducing a carrier gas into the magnesium containing vessel 16 is connected to a position in the top surface of the magnesium containing vessel 16 that is off the center of the top surface to the external side. The heat source 18 may be any type as long as it can heat metallic magnesium until it is evaporated. For example, the heat source 18 may be a resistive-heating type, a flame-heating type, and a high-frequency-heating type. Preferable magnesium vapor producing means is a magnesium vapor producing unit which comprises: a magnesium containing vessel in which metallic magnesium is contained; a heat source which covers the magnesium containing vessel except its top surface; and a magnesium vapor jetting nozzle from which magnesium vapor is jetted out into a mixed vapor jetting nozzle, and to which a carrier gas introduction duct for introducing a carrier gas into the magnesium containing vessel is connected.

The mixed vapor jetting nozzle 20 is a bottomed cylindrical nozzle of which jetting port is opened at the top, and the jetting port of the zinc vapor jetting nozzle 24 is connected to the center of the bottom of the mixed vapor jetting nozzle 20. The magnesium vapor jetting nozzle 28 extends upward into the mixed vapor jetting nozzle 20 from such a position in the bottom surface of the mixed vapor jetting nozzle 20 as is other than the center of the bottom surface, by curving from that position in the bottom surface to the center axis of the mixed vapor jetting nozzle 20 and then conforming with the direction of the center axis. The magnesium vapor jetting nozzle 28 has a diameter smaller than that of the mixed vapor jetting nozzle 20, and is opened upward at a position lower than the port of the mixed vapor jetting nozzle 20. That is, the zinc vapor jetting nozzle 24 and the magnesium jetting nozzle 28 are provided upstream of the jetting port of the mixed vapor jetting nozzle 20 so that the jetted zinc vapor and magnesium vapor may be mixed sufficiently. A swirl nozzle may be connected to the mixed vapor jetting nozzle 20, or a swirl vane may be provided on the mixed vapor jetting nozzle 20. Preferable mixed vapor producing means is such a mixed vapor jetting nozzle as described above of which jetting port is opened at the top, to Whose bottom the jetting port of the zinc vapor jetting nozzle is connected, and into which the magnesium jetting nozzle extends from whose bottom.

The top surface of the zinc containing vessel 12 and the top surface of the magnesium containing vessel 16, the zinc vapor jetting nozzle 24 and the magnesium vapor jetting nozzle 28, and the mixed vapor jetting nozzle 20 are covered by a heat source 32. The heat source 32 may be any type as long as it can heat zinc and magnesium to their boiling point or higher, and for example, may be a resistive-heating type, a flame-heating type, and a high-frequency-heating type.

The oxidizing gas contact unit 19 comprises a cylindrical oxidation reaction vessel 21, and oxidizing gas introducing means which is provided at such a position in the side surface of the oxidation reaction vessel 21 that is above the bottom surface of the oxidation reaction vessel 21, and at which the oxidizing gas introducing means does not spoil the efficiency of oxidation reaction. For example, oxidizing gas feeding nozzles 22 or the like are used as the oxidizing gas introducing means. The mixed vapor jetting nozzle 20 is connected to the center of the bottom surface of the oxidation reaction vessel 21. Two oxidizing gas feeding nozzles 22 are provided at equal intervals in the circumferential direction, but the interval and number of the nozzles are not limited in any way. The number of oxidizing gas feeding nozzles 22 is preferably a plural number, and more preferably 2 to 4. A discharging port 34 from which magnesium-containing zinc oxide is discharged is provided in the center of the top surface of the oxidation reaction vessel 21. Preferable oxidizing gas contact means is the oxidizing gas contact unit which comprises the oxidation reaction vessel and the oxidizing gas introducing nozzles.

Next, a method of producing magnesium-containing zinc oxide using the magnesium-containing zinc oxide producing apparatus 10 according to the present embodiment will be explained.

First, metallic zinc contained in the zinc containing vessel 12 is heated by the heat source 14 to equal to or higher than the boiling point of zinc, for example, 1000° C. or higher, preferably 1000 to 1200° C. to produce zinc vapor. Simultaneously, metallic magnesium contained in the magnesium containing vessel 16 is heated by the heat source 18 to equal to or higher than the boiling point of magnesium, for example, 1200° C. or higher, preferably 1200 to 1400° C. to produce magnesium vapor.

The produced zinc vapor flows into the zinc vapor jetting nozzle 24, and the magnesium vapor flows into the magnesium vapor jetting nozzle 28. For the purposes of preventing a choke, etc. of the mixed vapor jetting nozzle 20, an inert gas such as argon, helium, or the like is fed as a carrier gas into the zinc containing vessel 12 through the carrier gas introduction duct 26 and into the magnesium containing vessel 16 through the carrier gas introduction duct 30. It is preferable to feed the carrier gas by pre-heating it so as not to lower the temperature of the zinc vapor and magnesium vapor. For example, the carrier gas to be introduced into the zinc containing vessel 12 is heated to 1000 to 1200° C., and the carrier gas to be introduced into the magnesium containing vessel 16 is heated to 1200 to 1400° C.

The zinc vapor flows through the zinc vapor jetting nozzle 24 and jets out from the jetting port into the mixed vapor jetting nozzle 20. The magnesium vapor flows through the magnesium vapor jetting nozzle 28 and jets out from the jetting port into the mixed vapor jetting nozzle 20. Since the jetting port of the magnesium vapor jetting nozzle 28 is located in the mixed vapor jetting nozzle 20 below the jetting port of the mixed vapor jetting nozzle 20 and above the jetting port of the zinc vapor jetting nozzle 24, the magnesium vapor jets into the zinc vapor flowing in the mixed vapor jetting nozzle 20. Therefore, the zinc vapor and the magnesium vapor mix efficiently.

It is preferable that the zinc vapor jetting nozzle 24, the magnesium vapor jetting nozzle 28, and the mixed vapor jetting nozzle 20 be heated to 1200 to 1400° C. by the heat source 32. Since the temperature of the zinc vapor is lower than the temperature of the magnesium vapor, if the nozzles are not heated, the magnesium vapor is cooled by the zinc vapor to demix into magnesium, which might make it impossible to obtain magnesium-containing zinc oxide with a high concentration of solid-solubilized magnesium.

It is preferable that the content rate (molar ratio) of magnesium in the mixed vapor be in the range of $0<\text{Mg}/(\text{Zn}+\text{Mg}) \leq 0.25$. In this expression, the content rate of magnesium is more preferably 0.05 or higher, particularly preferably 0.08 or higher, yet particularly preferably 0.10 or higher, and most preferably higher than 0.2. At this content rate of magnesium, magnesium-containing zinc oxide with a particularly high magnesium content that is suitable for a blue phosphor can be obtained. At the same time, it is preferable that the content rate of magnesium be 0.25 or lower. At this content rate of magnesium, mixing of cubic MgO into the magnesium-containing zinc oxide can be prevented.

The content rate of magnesium in the mixed vapor can be controlled based on, for example, the feeding speed of the zinc vapor and magnesium vapor. The feeding speed can be controlled based on, for example, the heating temperature of the heat source 14 and heat source 18, and the amount of the carrier gas to be introduced from the carrier gas introduction duct 26 and carrier gas introduction duct 30.

The mixed vapor of zinc vapor and magnesium vapor jetting out from the mixed vapor jetting nozzle 20 flows into the oxidation reaction vessel 21 and contacts the oxidizing gas introduced from the oxidizing gas feeding nozzles 22. The oxidizing gas may be air, oxygen, and oxygen-enriched air. Hence, the magnesium and zinc in the mixed vapor are immediately oxidized to produce powdery magnesium-containing zinc oxide. The particle size of the powder can be controlled based on the concentration of the zinc vapor and magnesium vapor from which the powder is produced, the oxidation reaction temperature, the oxidation reaction time, etc. An example way of obtaining a large particle size is to set a high evaporation rate for the zinc and magnesium used as the materials, set a high oxidation reaction temperature, and set a large diameter for the mixed vapor jetting nozzle 20 to achieve a low air speed and hence a long oxidation reaction time. There are no particular limitations on the oxidation reaction conditions, and it is possible to employ publicly-known conditions that are employed in the production of zinc oxide by a gas-phase method.

The produced magnesium-containing zinc oxide is guided from the discharging port 34 to a product collection device (unillustrated) such as a bag filter and collected therein. The magnesium-containing zinc oxide obtained in this way is represented by $Zn_{1-x}Mg_xO$. Here, x is preferably higher than 0 and 0.25 or lower, more preferably 0.05 or higher and 0.25 or lower, yet more preferably 0.08 or higher and 0.25 or lower, particularly preferably 0.10 or higher and 0.25 or lower, and most preferably higher than 0.20 and 0.25 or lower. The value of x can be adjusted based on the content rate of magnesium in the mixed vapor. It is preferable that the purity of the collected magnesium-containing zinc oxide be 99.9 mass % or higher. The method for producing magnesium-containing zinc oxide according to the present embodiment can produce magnesium-containing zinc oxide in the form of powder having a uniform particle size. This powder has a hexagonal Wurtzite crystal structure, and with an oxygen defect introduced therein by a heating treatment or the like under a reductive atmosphere, has a tendency of exhibiting a luminescence peak at a wavelength shorter than 500 nm, which is the luminescence peak wavelength of reduced zinc oxide (Zn:ZnO) with no solid-solubilized magnesium. This powder can be used as a blue phosphor, particularly as a blue phosphor for a fluorescent display tube and field emission purposes.

EXAMPLES

Next, a specific explanation will be given by raising examples and a comparative example. The apparatus schematically illustrated in FIG. 1 was used as the apparatus for producing magnesium-containing zinc oxide.

Example 1

Metallic zinc (provided by Kojundo Chemical Laboratory Co., Ltd.: with a purity of 99.9 mass % or higher) contained in the zinc containing vessel 12 (with an inner diameter of 150 mm and a height of 200 mm) was heated to 1000° C. by the heat source 14, and argon gas was fed from the carrier gas introduction duct 26 at a rate of 10 NL/min, Zinc vapor was produced at a rate of 0.90 kg/h. Simultaneously, metallic magnesium (provided by Kojundo Chemical Laboratory Co., Ltd.: with a purity of 99.9 mass % or higher) contained in the magnesium containing vessel 16 (with an inner diameter of 150 mm and a height of 200 mm) was heated to 1200° C. by the heat source 18, and argon gas was fed from the carrier gas introduction duct 30 at a rate of 1 NL/min. Magnesium vapor was produced at a rate of 0.01 kg/h.

The produced zinc vapor was guided through the zinc vapor jetting nozzle 24 (with an inner diameter of 4 mm) and jetted out into the mixed vapor jetting nozzle 20 (with an inner diameter of 20 mm and a length of 50 mm), and simultaneously the produced magnesium vapor was guided through the magnesium vapor jetting nozzle 28 (with an inner diameter of 4 mm and a length of 20 mm in the mixed vapor jetting nozzle 20) and jetted out into the mixed vapor jetting nozzle 20. The zinc vapor and the magnesium vapor were thereby mixed. The temperature in the mixed vapor jetting nozzle 20 was the same as the temperature in the magnesium containing vessel 16. Mixed vapor resulting from the mixing was jetted out into the oxidation reaction vessel 21 from the mixed vapor jetting nozzle 20. Air was fed into the oxidation reaction vessel 21 through the oxidizing gas feeding nozzles at a rate of 100 NL/min, and the mixed vapor and the air were brought into contact and caused an oxidation reaction. The resulting magnesium-containing zinc oxide was guided from the discharging port 34 to a bag filter (unillustrated) by a vacuum fan (unillustrated) and collected in the bag filter, and hence magnesium-containing zinc oxide according to Example 1 was obtained. The magnesium-containing zinc oxide according to Example 1 was powdery. The production conditions are shown in Table 1. The obtained magnesium-containing zinc oxide was analyzed in the manner described below.

(Composition)

The composition of the magnesium-containing zinc oxide was analyzed by an ICP luminescence analysis. The result is shown in Table 2.

(Crystal Phase)

The crystal structure of the magnesium-containing zinc oxide was measured by powder X-ray diffractometry. The result is shown in Table 2.

(Amount of Solid-Solubilized Mg)

The amount of solid-solubilized magnesium was calculated from the result of the crystal phase measurement (a hexagonal form was produced) and the result of the measurement of the composition (Mg content). The result is shown in Table 2.

(Lattice Constant)

Figure 2:
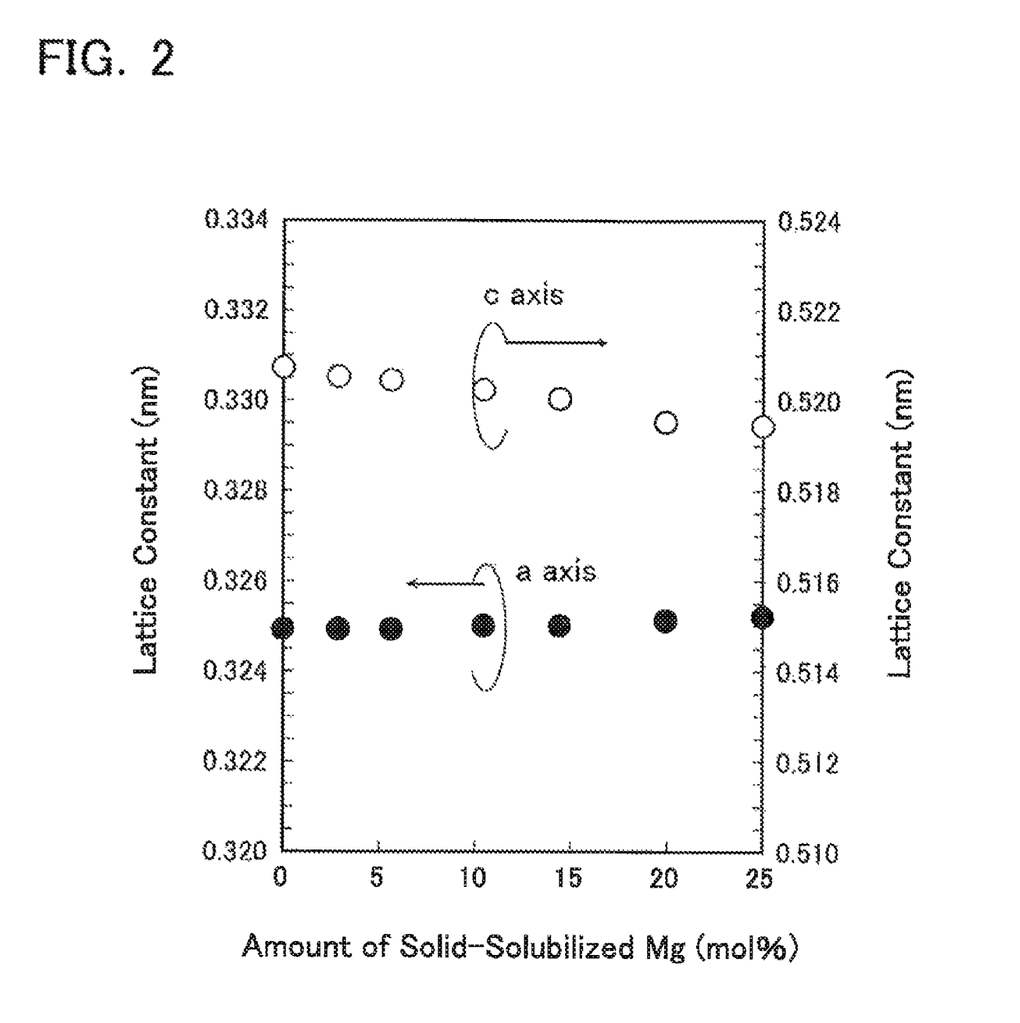
FIG. 2 is a graph showing a relationship between lattice constant and amount of solid-solubilized magnesium.

The lattice constant was calculated by powder X-ray diffractometry in which Si standard powder was used as an internal standard. The result is shown in Table 2. The relationship between the lattice constant and the amount of solid-solubilized magnesium is shown in FIG. 2.

(Peak Wavelength)

Figure 3:
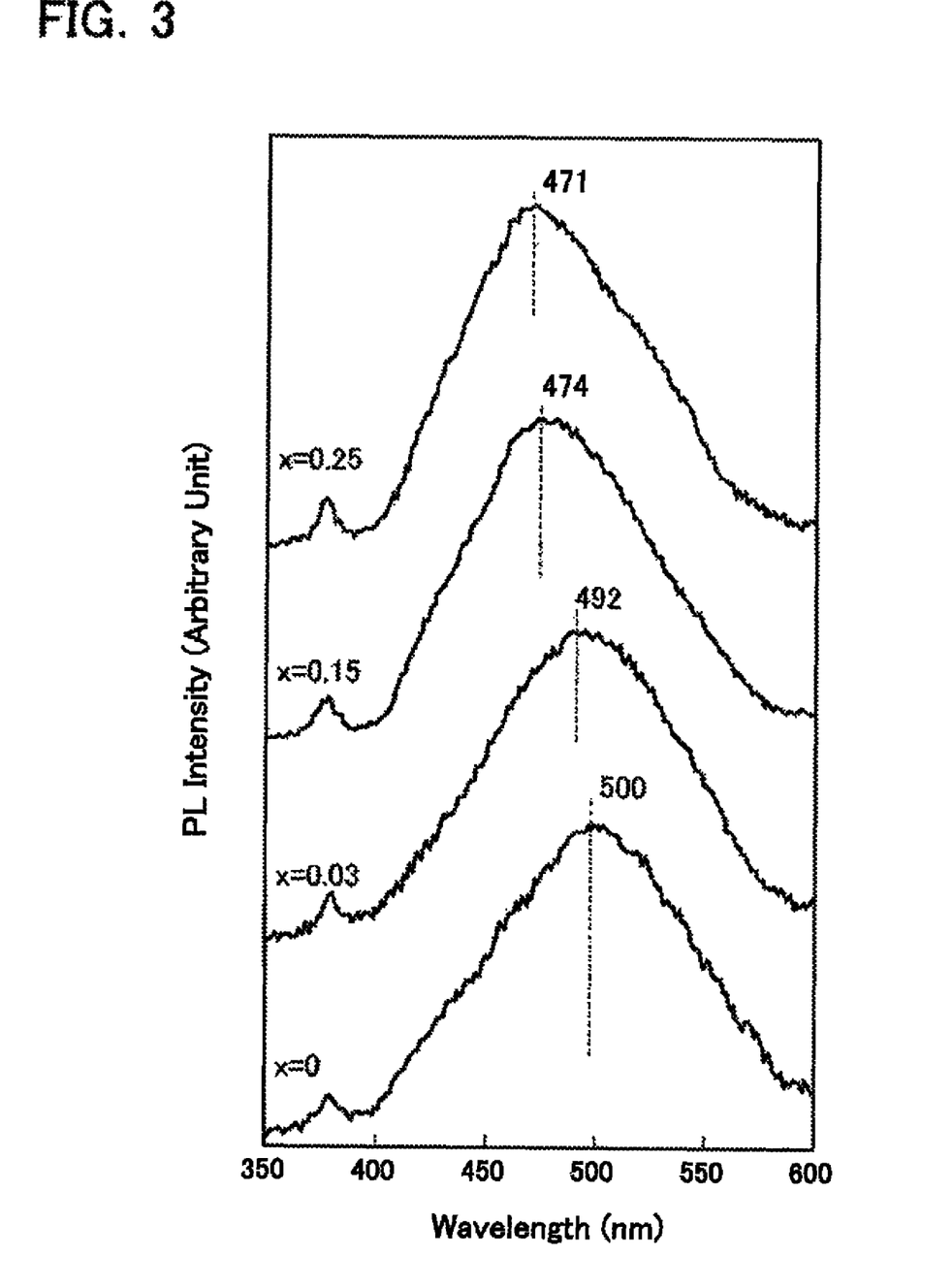
FIG. 3 shows a PL spectrum measured by a spectrophotofluorometer.
Figure 4:
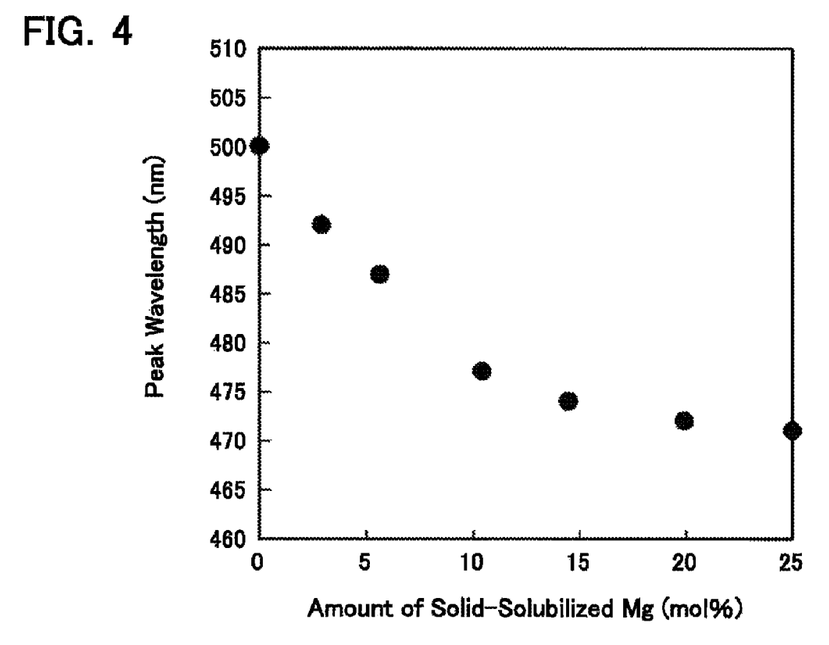
FIG. 4 is a graph showing a relationship between PL spectrum peak wavelength and amount of solid-solubilized Mg.

The PL spectrum peak wavelength of the magnesium-containing zinc oxide was measured as follows. First, a blue phosphor powder was produced from the magnesium-containing zinc oxide powder by introducing an oxygen defect into the magnesium-containing zinc oxide powder by subjecting the magnesium-containing zinc oxide powder to a reduction treatment for 2 hours at 800° C. under an argon gas atmosphere containing 5 v/v % of hydrogen gas. The PL spectrum of the blue phosphor powder was measured by a spectrophotofluorometer (provided by JASCO Corporation, FP-6500) at an excitation wavelength of 320 nm. The result is shown in Table 2 and FIG. 3. The relationship between the PL spectrum peak wavelength and the amount of solid-solubilized Mg is shown in FIG. 4.

(Impurities)

An ICP luminescence analysis was conducted to measure metallic impurities (Pb, Na, Al, Si, S, K, Ca, Fe, Ni, Cu, Ag, Cd, Te, Bi) in the magnesium-containing zinc oxide. The metallic impurities content was 55 ppm, and the purity of the magnesium-containing zinc oxide was 99.9 mass % or higher. The details of the result of Example 1 are shown in Table 3.

(Particle Size Distribution)

Figure 5:
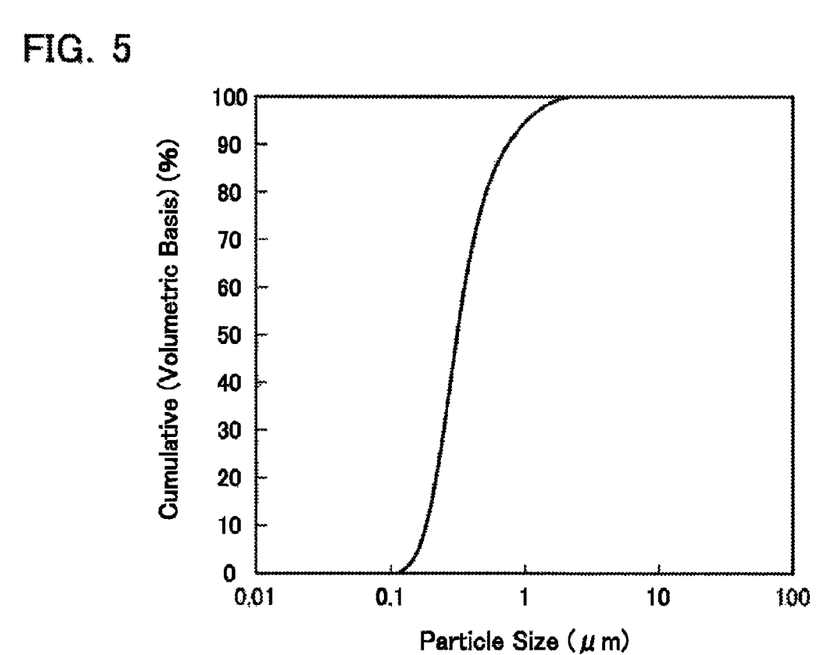
FIG. 5 shows a particle size distribution measured by a laser diffraction scattering method.

The particle size distribution of the magnesium-containing zinc oxide was measured by a laser diffraction scattering method (LA-910 provided by HORIBA, Ltd.) The result was a monodispersed sharp particle size distribution as shown in FIG. 5.

TABLE 1

|  | Zn | | | Mg | | | | |
| --- | --- | --- | --- | --- | --- | --- | --- | --- |
|  | Vessel temperature (° C.) | Argon gas feed (NL/min) | Vapor yield (kg/h) | Vessel temperature (° C.) | Argon gas feed (NL/min) | Vapor yield (kg/h) | Molar ratio *1 | Air feed (NL/min) |
| Example 1 | 1000 | 10 | 0.90 | 1200 | 1 | 0.01 | 0.03 | 100 |
| Example 2 | 1000 | 10 | 0.90 | 1200 | 2 | 0.02 | 0.06 | 100 |
| Example 3 | 1020 | 10 | 0.92 | 1250 | 2 | 0.04 | 0.10 | 100 |

TABLE 1-continued

| | Zn | | | Mg | | | | |
|---|---|---|---|---|---|---|---|---|
| | Vessel temperature (° C.) | Argon gas feed (NL/min) | Vapor yield (kg/h) | Vessel temperature (° C.) | Argon gas feed (NL/min) | Vapor yield (kg/h) | Molar ratio *1 | Air feed (NL/min) |
| Example 4 | 1050 | 10 | 0.95 | 1250 | 4 | 0.06 | 0.15 | 100 |
| Example 5 | 1070 | 10 | 0.97 | 1300 | 5 | 0.09 | 0.20 | 100 |
| Example 6 | 1070 | 10 | 0.97 | 1330 | 5 | 0.12 | 0.25 | 100 |
| Comparative Example 1 | 1100 | 10 | 1.00 | — | — | — | — | 100 |

*1: Molar ratio was calculated according to the following formula
Molar ratio = (Mg vapor yield (mol/h))/((Zn vapor yield (mol/h) + (Mg vapor yield (mol/h)))

TABLE 2

| | Composition | Crystal phase | Amount of Mg solid-solubilized (mol %) | Lattice constant a axis (nm) | Lattice constant c axis (nm) | Peak wavelength (nm) |
|---|---|---|---|---|---|---|
| Example 1 | $Zn_{0.97}Mg_{0.03}O$ | Hexagonal form | 3 | 0.3249 | 0.5205 | 492 |
| Example 2 | $Zn_{0.94}Mg_{0.06}O$ | Hexagonal form | 6 | 0.3249 | 0.5204 | 487 |
| Example 3 | $Zn_{0.90}Mg_{0.10}O$ | Hexagonal form | 10 | 0.3250 | 0.5202 | 477 |
| Example 4 | $Zn_{0.85}Mg_{0.15}O$ | Hexagonal form | 15 | 0.3250 | 0.5200 | 474 |
| Example 5 | $Zn_{0.80}Mg_{0.20}O$ | Hexagonal form | 20 | 0.3251 | 0.5195 | 472 |
| Example 6 | $Zn_{0.75}Mg_{0.25}O$ | Hexagonal form | 25 | 0.3252 | 0.5194 | 471 |
| Comparative example 1 | ZnO | Hexagonal form | — | 0.3249 | 0.5205 | 500 |

TABLE 3

| Metallic impurities content (ppm) | | | | | | | | | | | | | | |
|---|---|---|---|---|---|---|---|---|---|---|---|---|---|---|
| Pb | Na | Al | Si | S | K | Ca | Fe | Ni | Cu | Ag | Cd | Te | Bi | Total |
| 7.4 | 5.0 | 2.8 | 14 | 9.8 | 4.2 | 3.6 | 2.6 | 1.0 | 1.8 | 0.5 | 0.5 | 0.6 | 0.9 | 55 |

Since the materials from which the magnesium-containing zinc oxide according to Example 1 was produced were only metallic zinc and metallic magnesium, the obtained magnesium-containing zinc oxide did not contain any halogen components such as fluorine, chlorine, etc.

Examples 2 to 6

Magnesium-containing zinc oxide was produced in the same manner as Example 1 except that the conditions were set as shown in Table 1. The composition, crystal phase, amount of solid-solubilized Mg, lattice constant, and peak wavelength were measured in the same manner as Example 1, and the results are likewise shown in Table 2. Impurities and particle size distribution were also measured in the same manner as Example 1, and similar results were obtained. Since the materials from which the magnesium-containing zinc oxide according to Examples 2 to 6 was produced were only metallic zinc and metallic magnesium, the obtained magnesium-containing zinc oxide did not contain any halogen components such as fluorine, chlorine, etc.

Comparative Example 1

Zinc oxide was produced in the same manner as Example 1 except that no magnesium vapor was fed and the conditions were set as shown in Table 1. The composition, crystal phase, amount of solid-solubilized Mg, lattice constant, and peak wavelength were measured in the same manner as Example 1, and the results are likewise shown in Table 2.

It can be understood from Examples 1 to 6 that magnesium-containing zinc oxide having a high purity was obtained because no other diffraction peaks were observed than those corresponding to a ZnO solid solution, which had a hexagonal Wurtzite structure as the crystal phase. Further, since the particle size distribution (FIG. 5) measured by a laser diffraction scattering method was sharp, it can be understood that homogeneous magnesium-containing zinc oxide having a uniform particle size was obtained. Yet further, it is seen from the relationship between the lattice constant and the amount of solid-solubilized magnesium (FIG. 2) that no change occurred on the a axis depending on the amount of solid-solubilized magnesium whereas the lattice constant decreased on the c axis as the amount of solid-solubilized magnesium increased. That is, it can be understood that magnesium was solid-solubilized continuously in the zinc oxide. Furthermore, it is seen from the relationship between the peak wavelength and the amount of solid-solubilized Mg (FIG. 4) that as magnesium solid-solubilized more in the range up to 25.0 mol %, the peak wavelength shifted more to the short wavelength side, which indicates that a zinc oxide blue phosphor was produced. Especially, when the amount of solid-solubilized magnesium was 10 to 25 mol %, the peak wavelength shifted to the short wavelength side to 477 to 471 nm, which indicates that magnesium-containing zinc oxide suitable as a blue phosphor was obtained.

DESCRIPTION OF REFERENCE NUMERALS

10 magnesium-containing zinc oxide producing apparatus
11 zinc vapor producing unit
12 zinc containing vessel
14, 18 heat source
15 magnesium vapor producing unit 16 magnesium containing vessel
19 oxidizing gas contact unit
20 mixed vapor jetting nozzle
21 oxidation reaction vessel
22 oxidizing gas feeding nozzle

The invention claimed is:

1. A method for producing magnesium-containing zinc oxide, comprising:
    a step of producing zinc vapor by heating metallic zinc;
    a step of producing magnesium vapor by heating metallic magnesium;
    a step of producing mixed vapor by mixing the zinc vapor and the magnesium vapor; and
    a step of producing magnesium-containing zinc oxide by bringing an oxidizing gas into contact with the mixed vapor,
    wherein a content of zinc in the mixed vapor is higher than that of magnesium,
    and metallic zinc and metallic magnesium respectively are heated in different vessels.

2. The method for producing magnesium-containing zinc oxide according to claim 1,
    wherein a molar ratio of magnesium in the mixed vapor is in a range of $0<Mg/(Zn+Mg)\leqq 0.25$.

3. The method for producing magnesium-containing zinc oxide according to claim 1,
    wherein a molar ratio of magnesium in the mixed vapor is in a range of $0.05\leqq Mg/(Zn+Mg)\leqq 0.25$.

* * * * *